United States Patent [19]

Cady

[11] E Re. 29,958

[45] Reissued Apr. 10, 1979

[54] PUNCH AND STRIPPER ASSEMBLY

[75] Inventor: Percy L. Cady, Darien Center, N.Y.

[73] Assignee: Houdaille Industries, Inc., Fort Lauderdale, Fla.

[21] Appl. No.: 860,399

[22] Filed: Dec. 14, 1977

Related U.S. Patent Documents

Reissue of:

[64] Patent No.: 4,031,787
Issued: Jun. 28, 1977
Appl. No.: 709,338
Filed: Jul. 28, 1976

[51] Int. Cl.[2] ..... B26F 1/14

[52] U.S. Cl. ..... 83/140; 83/588

[58] Field of Search ..... 83/140, 143, 588, 635

[56] References Cited

U.S. PATENT DOCUMENTS

| | | | |
|---|---|---|---|
| 3,342,091 | 9/1967 | Schott et al. | 83/140 |
| 3,935,771 | 2/1976 | Cady, Jr. | 83/140 |
| 3,935,772 | 2/1976 | Demus et al. | 83/140 |
| 3,958,476 | 5/1976 | Bartha | 83/143 |

*Primary Examiner*—Frank T. Yost

*Attorney, Agent, or Firm*—Hill, Gross, Simpson, Van Santen, Steadman, Chiara & Simpson

[57] ABSTRACT

A Punch and Stripper Assembly for use in a punch press includes a punch with a shoulder at an intermediate portion thereof, a head threaded onto an end of the punch for being engaged by the ram of the press, a compression spring engaging the head, a washer engaging the opposite end of the spring, a retainer acting between the punch shoulder and the washer, and a stripper sleeve for acting between the workpiece and the retainer, whereby the position of the head on the punch provides a preload to maximize spring life, as well as to control the effective height of the assembly with respect to the ram. With this assembly, no special tooling is needed to assemble it. The retainer can be inverted to alter the retractive position of the punch shoulder.

19 Claims, 5 Drawing Figures

Fig. 1
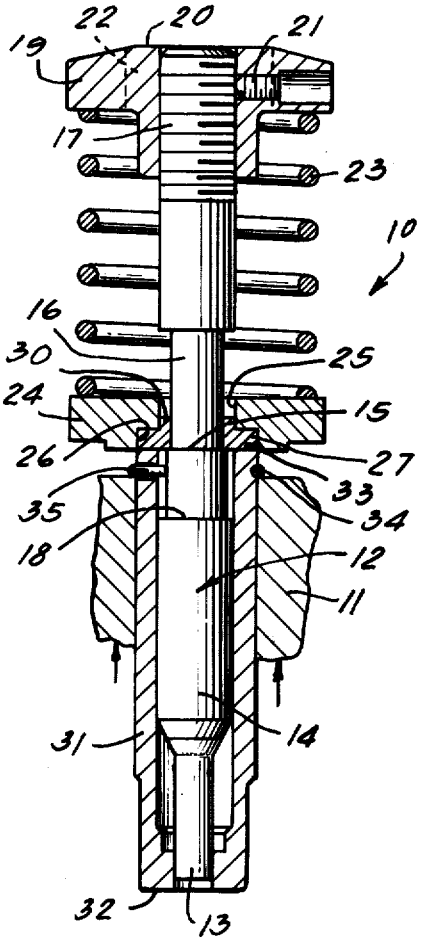
Fig. 2
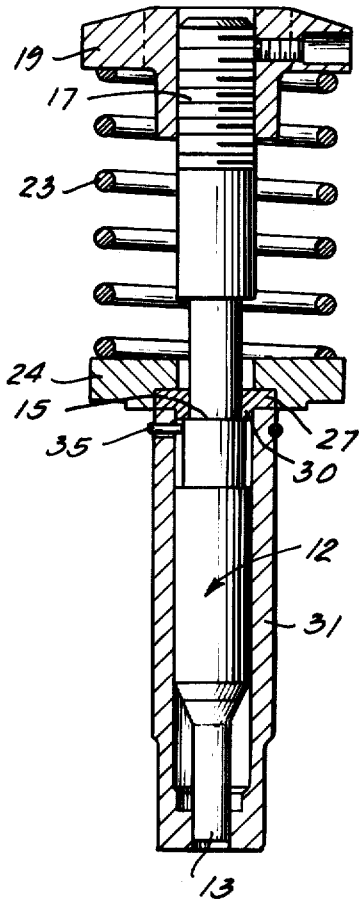
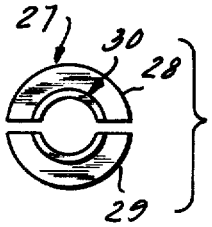
Fig. 3
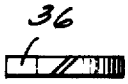
Fig. 4
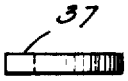
Fig. 5

PUNCH AND STRIPPER ASSEMBLY

Matter enclosed in heavy brackets [ ] appears in the original patent but forms no part of this reissue specification; matter printed in italics indicates the additions made by reissue.

*This is a reissue application of U.S. Pat. No. 4,031,787 which issued on June 28, 1977.*

BACKGROUND OF THE INVENTION

1. Field of the Invention

This invention relates to a punch and stripper assembly for use in press-type of machine tools.

2. Prior Art

It has long been the practice, which still continues, to utilize a stripping spring in a punch and stripper assembly where the stripper spring is permitted to expand to its free length after a power stroke. Such practice causes the spring to be stressed from zero to a maximum, which minimizes spring life. Further, the length of the assembly cannot be absolutely controlled because of the inherent differences in the lengths of the springs of a production lot, and also because the free length of springs tends to change with flexing, particularly when a spring is new. When punch and stripper assemblies are utilized in contemporary high performance equipment, the tooling length or envelope must be controlled. An example of a punching device having a punch and stripper assembly of such prior type is shown in U.S. Pat. No. 2,953,051.

To provide a preload on a stripping spring is known, as shown in U.S. Pat. No. 3,079,824. However, the prior types of punch and stripper assemblies that do have a preload on the stripping spring are so constructed that special tooling is needed to order to put the assembly together or to disassemble it for service, such as needed to replace a broken spring.

SUMMARY OF THE INVENTION

The punch and stripper assembly of the invention includes a punch having an intermediate shoulder, an enlarged head threaded on an end of the punch, a compression spring which is preloaded by the adjustment of the head which engages the ram, the other end of the spring being engaged by a washer, a retainer acting between the punch shoulder and the washer, and a stripper sleeve for acting between the workpiece and the retainer. In a preferred form, the retainer is a split ring having separate sections retained together by being at least partially disposed in a counterbore in the washer. Further, the retainer preferably includes a cylindrical projection so that when the retainer is inverted, the effective position of the punch is altered.

Accordingly, it is an object of the present invention to provide an improved punch and stripper assembly.

Another object of the present invention is to provide a punch and stripper assembly having a preloaded stripping spring.

Another object of the present invention is to provide a punch and stripper assembly wherein its effective length or envelope size can be adjustably controlled.

A still further object of the present invention is to provide a punch and stripper assembly which can be assembled and disassembled without use of special tools even though the stripping spring is preloaded.

Yet another object of the present invention is to provide a punch and stripper assembly wherein effective length thereof can be controlled even though there has been considerable shortening of the punch as a consequence of regrinding to sharpen the punch.

Many other objects, features and additional advantages of the present invention will become apparent to those skilled in the art from the drawing and the detailed description relating thereto.

BRIEF DESCRIPTION OF THE DRAWING

FIG. 1 is a cross-sectional view of punch and stripper assembly provided in accordance with the present invention;

FIG. 2 is a similar view of the punch and stripper assembly of FIG. 1, but shown after having been readjusted as a consequence of punch sharpening;

FIG. 3 is a plan view of the device shown in FIGS. 1 and 2; and

FIGS. 4 and 5 are elevational views of modified forms of the part shown in FIG. 3.

AS SHOWN ON THE DRAWINGS

The principles of the present invention are particularly useful when embodied in a punch and stripper assembly such as shown in FIG. 1, generally indicated by the numeral 10. A device or assembly of this type can be used in numerous types of punch presses such as turret presses, single station presses, and sub-press tooling. In such type of punch press tooling, a punch ram (not shown) acts on the upper end of the punch and stripper assembly 10 to force it against a workpiece (not shown), a reactive force being provided by a suitable die (not shown) disposed on the opposite side of the workpiece, all as is well known. Further, with tooling of this type, some type of lifting means is employed, schematically indicated by a springloaded adapter II which holds the punch and stripper assembly 10 in an elevated position after the ram has retracted therefrom in its return stroke.

The punch and stripper assembly 10 includes a punch 12 having one end 13 adapted for cutting or forming, and thus for coacting with the die. The punch 12 has an enlarged intermediate body portion 14 by which the punch is guided during reciprocation, there being a shoulder 15 which faces away from the end 13 and from which a reduced diameter portion 16 extends. The upper end of the punch 12 is a threaded end portion 17, there being a second shoulder 18 facing away from the cutting end 13. An enlarged head 19 is threaded and is carried on the threaded end portion 17, it having an upper surface 20 which is directed to be engaged by the ram. A set screw 21 is carried by the head 19 for acting against the punch 12 to hold the head 19 in a selected position. The head 19 has a pair of oppositely facing flat surfaces 22 which facilitate the selective positioning of the head 19 on the punch 12.

A compression spring 23 has an upper end which engages the lower surface of the head 19, the lower end of the spring 23 engaging against a washer 24 which has a bore 25 and a counterbore 26. A retainer 27 acts between the punch shoulder 15 and the washer 24, and such engagement is maintained at all times by the force from the spring 23. The retainer 27 comprises a split ring that has a pair of separate sections 28, 29, best seen in FIG. 3, which, as shown in FIG. 1 extend at least partially into the counterbore 26 in the washer 24. As shown in FIGS. 1 and 3, the retainer 27 has a cylindrical projection 30 which extends into the bore 25. Thus the cylindrical projection 30 is of lesser diameter than that of the counterbore 26 and projects from the retainer 27 in only one direction, such projection being axially beyond the counterbore into the bore 25 in the washer 24. The assembly 10 further includes a stripper sleeve 31 which has a lower end 32 for engaging the workpiece and which surrounds the end portion 13 of the punch 12. At its upper end 33, the sleeve 31 engages the retainer 27. Adjacent to the end 33, the sleeve 31 has a groove in which a second retainer 34 is disposed. The second retainer 34 is in the form of a wire spring which substantially encircles the sleeve 31, the retainer 34 having one end 35 that extends through an opening in the sleeve 31. When the punch and stripper assembly 10 is being handled separately from the punch press, the end 35 of the retainer 34 acts against the shoulder 18 to hold the assembly in assembled relationship. The retainer 34 thus firmly engages and encircles the sleeve 31 adjacent to the first retainer 27 and provides a means against which a lifting force can be applied to the assembly 10.

The assembly is put together in the following manner: The head 19 is threaded onto the end portion 17 of the punch 12 with only approximately two threads engaging. The spring 23 is then slipped on as is the washer 24. The retainer 27 is then put into position about the reduced diameter portion 16, the washer 24 then being disposed nearer the upper end of the punch. The head 19 is then tightened which can be done by hand or with the assistance of a non-special hand tool, and the tightening is continued until the upper end of the punch 12 almost reaches the upper surface 20 of the head 19. The is the position illustrated in FIG. 1. The stripper sleeve 31 is then slipped over the other end of the punch, and then the second or spring retainer 34 is snapped into position. The assembly 10 is then ready for use in a punch press.

The assembly is assembled with ease and it has a predetermined length, thus facilitating its use in presses where the length must be accurately established. In that the spring 23 is preloaded, maximum spring-life is obtained.

In place of the retainer 27, a split retainer 36 (FIG. 4) may be utilized. Prior to assembly, the retainer 36 has an open gap that permits it to be passed over the reduced diameter portion 16 of the punch 12. Thereafter, the retainer 36 is deformed so that it has a sliding fit with the portion 16. Normally the retainer 36 is not thereafter removed from the punch 12.

Another form of retainer is shown at 37 in FIG. 5. Here the retainer is in the form of a solid ring which had an initial diameter such that it could be slipped over one of the ends of the punch 12. After it is in a position of registration with the reduced diameter portion 16, it too is deformed, as by swagging, to be permanently carried on the punch 12.

In a typical installation, the punch 12, when new, will enter a new die by 0.062 inches. As a consequence of usage, the tip 13 will need to be sharpened, and thus shortened by whatever length is ground off. If 0.010 inch is ground off, then the head 19 can be backed off by a corresponding amount, thus maintaining the effective length of the punch. However, in a typical installation, the head can be backed off only so much from the initial illustrated position, 0.053 inch being a typical maximum amount. Assuming that 0.053 inch has been ground off, the head 19 is then backed off a corresponding amount. However, this amount, the maximum permitted by the ram location, still provides 0.072 inch preload on the spring. If the retainer 36 or 37 is used, after there has been 0.053 inch removed from the punch tip, the punch would have reached the end of its usable life. Even with a grind increment of 0.053 inches, die penetration of at least 0.009 inch will be assured because such grind increment is less than the initial die penetration.

However, according to the preferred form of the invention, when the retainer 27 is used, it can be inverted as shown in FIG. 2 to provide a second grind increment of 0.053 inches, thus doubling the effective life of the punch. While FIG. 1 illustrates the assembly adjusted for a new punch, FIG. 2 illustrates the same assembly adjusted for a punch that has had its first maximum grinding increment removed. With the retainer 27 inverted, the cylindrical projection 30 then exceeds into the sleeve 31 so that the shoulder 15 is arrested that much sooner. However, the upper end 33 of the sleeve 31 still engages the retainer 27 at a point which is substantially flush with the bottom of the washer 24. Thus FIG. 2 shows the punch tip 13 that has been shortened and shows the head 19 backed off the threaded end portion 17 by a corresponding amount.

Although various minor modifications might be suggested by those versed in the art, it should be understood that I which to embody within the scope of the patent warranted hereon, all such embodiments as reasonably and properly come within the scope of my contribution to the art.

I claim as my invention:

1. A punch and stripper assembly for use with a die on a workpiece beneath the ram of a punch press, comprising:

a. a punch having means at one end thereof for coacting with said die, an intermediate body portion, a shoulder facing away from said one end, and a threaded end portion at the opposite end;

b. an enlarged head adjustably carried on said threaded end portion for being engaged by the ram;

c. a compression spring surrounding said opposite end of said punch, and at one end engaging said head;

d. a washer surrounding said punch and engaging the opposite end of said spring;

e. a retainer acting between said punch shoulder and said washer, and held in engagement therewith by said spring; and f. a stripper sleeve surrounding said body portion of said punch for transferring a reactive force from the workpiece to said retainer during a power stroke of the punch press to store energy in said spring.

2. A punch and stripper assembly according to claim 1, said retainer slidably engaging a reduced diameter portion of said punch extending from said punch shoulder.

3. A punch and stripper assembly according to claim 2, said retainer being a split ring deformed onto said reduced diameter portion of said punch.

4. A punch and stripper assembly according to claim 2, said retainer being a solid ring deformed onto said reduced diameter portion of said punch.

5. A punch and stripper assembly according to claim 2, said retainer being a split ring comprising two separate sections jointly surrounding said reduced diameter portion of said punch, and said washer having a counterbore in which said retainer sections are at least partially disposed.

6. A punch and stripper assembly according to claim 5, said retainer having a cylindrical projection of reduced diameter at one side thereof for extending axially beyond said counterbore into said washer, and, when inverted, for engaging said shoulder and for extending axially into said sleeve.

7. A punch and stripper assembly according to claim 1, including a second retainer acting between said sleeve and said punch for holding them in assembled relation when the assembly is out of the punch press.

8. A punch and stripper assembly according to claim 7, said second retainer being a spring substantially encircling said sleeve and having an end projecting through said sleeve for engagement with a second shoulder on said punch.

9. A punch and stripper assembly according to claim 1, including means firmly encircling said sleeve adjacent to said retainer to which a lifting force is to be applied for said assembly from said punch press.

10. A punch and stripper assembly according to claim 9, said encircling means being a spring encircling said sleeve in a groove.

*11. A punch and stripper assembly for use in association with a punching device which receives the punch and stripper assembly comprising: an elongated punch body having a cutting end and a heat end, at least one recess in said body intermediate said ends, a head member affixed to said head end, a stripper sleeve slidably received over said cutting end and surrounding intermediate portions of said body intermediate said ends, said sleeve movable with respect to said punch body, a washer positioned between said sleeve and said head, a stripper spring positioned between said head and said washer urging said washer towards sleeve, retainer means for retaining the sleeve on the punch including a substantially radial aperture through the sleeve alignable with the recess in the body portion of the punch, a circumferential groove in an exterior of the sleeve open to the aperture, a retainer portion in the aperture, spring means in the groove maintaining the retainer portion in the aperture, said spring means extending radially outwardly of the sleeve, said spring means forming a radially projecting abutment surface against which an axial lifting force is to be applied from said device for lifting the assembly said surface extending radially outwardly beyond an outer diameter surface of the sleeve, and sleeve encircling lifter means on said punching device having a sleeve receiving opening therethrough with an inner diameter less than an outer diameter of the spring means and a face contacting the spring means applying the lifting force to the spring means.*

*12. The device of claim 11 wherein the lifting force is transmitted from the spring means to the sleeve and from the sleeve to the washer.*

*13. The device of claim 12 wherein the sleeve is freely received on the punch body and is retained thereon by the retainer portion projecting into the recess, said projection of the retainer portion maintained by said spring means.*

*14. A punch and stripper assembly for use in association with a punching device which receives the punch and stripper assembly comprising: an elongated punch body having a cutting end and a head end, at least one recess in said body intermediate said ends, a head member affixed to said head end, a stripper sleeve slidably received over said cutting end and surrounding intermediate portions of said body intermediate said ends, said sleeve movable with respect to the said punch body, a washer positioned between said sleeve and said head, a stripper spring positioned between said head and said washer urging said washer towards sleeve, retainer means for retaining the sleeve on the punch including a substantially radial aperture through the sleeve alignable with the recess in the body portion of the punch, a circumferential groove in an exterior of the sleeve open to the aperture, a retainer portion in the aperture, spring means in the groove maintaining the retainer portion in the aperture, said spring means extending radially outwardly of the sleeve, said spring means forming an abutment surface against which an axial lifting force is to be applied from said device for lifting the assembly, the lifting forces transmitted from the spring means to the sleeve and from the sleeve to the washer, the sleeve is freely received on the punch body and is retained thereon by the retainer portion projecting into the recess, said projection of the retainer portion maintained by said spring means, the punch body is provided with a substantially radial shoulder intermediate the ends thereof facing away from said cutting end, the washer having a bore therethrough having an enlarged bore section open to an axial end thereof communicating internally of the washer with a reduced bore section, the punch body received through said bore, a retainer member in said enlarged bore section, said retainer acting between a punch body shoulder and said washer and held in engagement therewith by said stripping spring whereby a reactive force from a workpiece being acted upon by said punch and stripper assembly is transferred from said sleeve to said washer to store energy in said spring.*

*15. A punch and stripper assembly for use with a die on a workpiece beneath the ram of a punch press comprising:*

*a. a punch having means at one end thereof for coacting with said die, an intermediate body portion shoulder facing away from said one end, and a threaded end portion at the opposite end;*

*b. an enlarged head adjustably carried on said threaded end portion for being engaged by the ram;*

*c. a compression spring surrounding said opposite end of said punch, and at one end engaging said head;*

*d. a washer surrounding said punch and engaging the opposite end of said spring;*

*e. a retainer acting between said punch shoulder and said washer, and held in engagement therewith by said spring;*

*f. a stripper sleeve surrounding said body portion of said punch for transferring a reactive force from the punch to said retainer during the power stroke of the punch press to store energy in said spring;*

*g. a second retainer acting between said sleeve and said punch for holding them in assembled relation when the assembly is out of the punch press, said second retainer including a spring member substantially encircling said sleeve in a sleeve groove and a second retainer portion projecting through said sleeve for engagement with a second shoulder on said punch, the spring member maintaining the second retainer portion in an aperture through said sleeve and urging the said second retainer portion radially inwardly, said spring member providing abutment means to which a lifting force is to be applied for said assembly from said punch press;*

*h. and lifting means received around said sleeve when said assembly is in position in said punch press, said lifting means engaging said spring.*

*16. A punch and stripper assembly for use in association with a punching device which receives the punch and stripper assembly comprising: an elongated punch body having*

*a cutting end and a head end, a head member affixed to said head end and axially adjustable thereon, a washer member interposed between said head end and said cutting end, a stripper spring between said head and said washer, means retaining said washer on said punch body, a stripper sleeve received around the cutting end portion of said punch body, said stripper sleeve being positioned with respect to said washer to transmit an axial force applied to said stripper sleeve through said washer to said spring to store energy in said spring, the adjustability of said head on said body providing a preload of said stripper spring, the means retaining the washer on the said punch body limiting movement of the washer axially of the body away from the said load member and said stripper spring whereby the preload is maintained, the washer being axially movable on the punch body away from the cutting end, the means retaining the washer on the spring comprises a ledge formed on said punch body intermediate said ends, a retainer member interposed between said ledge and radial face of said washer, the preload urging the washer against the retainer and the retainer against the ledge.*

*17. The device of claim 16 wherein the retainer is a ring member circumferentially received around the punch body.*

*18. The device of claim 17 wherein the retainer is seated in an enlarged bore section of a bore through the washer, the bore receiving the punch body, the retainer engaging a ledge face of the washer formed at the enlarged bore section.*

*19. The device of claim 18 wherein the retainer is a multi-piece ring member and wherein the punch body ledge is formed as a face of a diameter reducing portion of the punch body.*

* * * * *